United States Patent
Hofheinz et al.

(10) Patent No.: US 9,586,864 B2
(45) Date of Patent: Mar. 7, 2017

(54) RAPIDLY SUSPENDABLE PULVERULENT COMPOSITION

(71) Applicant: BASF SE, Ludwigshafen (DE)

(72) Inventors: Christoph Hofheinz, Stephanskirchen (DE); Manfred Bichler, Engelsberg (DE); Michael Schinabeck, Altenmarkt (DE); Markus Wiedemann, Gablingen (DE); Thomas Heichele, Bobingen (DE); Werner Stohr, Augsburg (DE); Silke Flakus, Ebersberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/762,853

(22) PCT Filed: Mar. 24, 2014

(86) PCT No.: PCT/EP2014/055779
§ 371 (c)(1),
(2) Date: Jul. 23, 2015

(87) PCT Pub. No.: WO2014/154599
PCT Pub. Date: Oct. 2, 2014

(65) Prior Publication Data
US 2016/0016851 A1    Jan. 21, 2016

(30) Foreign Application Priority Data
Mar. 26, 2013 (EP) ..................................... 13161135

(51) Int. Cl.
| | | |
|---|---|---|
| *C04B 24/26* | (2006.01) | |
| *C04B 28/14* | (2006.01) | |
| *C04B 28/16* | (2006.01) | |
| *C04B 40/00* | (2006.01) | |
| *C04B 20/10* | (2006.01) | |
| C04B 111/00 | (2006.01) | |
| C04B 111/60 | (2006.01) | |
| C04B 111/62 | (2006.01) | |
| C04B 111/72 | (2006.01) | |

(52) U.S. Cl.
CPC .......... *C04B 24/26* (2013.01); *C04B 20/1033* (2013.01); *C04B 28/147* (2013.01); *C04B 28/16* (2013.01); *C04B 40/0028* (2013.01); *C04B 2111/0062* (2013.01); *C04B 2111/00482* (2013.01); *C04B 2111/00939* (2013.01); *C04B 2111/60* (2013.01); *C04B 2111/62* (2013.01); *C04B 2111/72* (2013.01)

(58) Field of Classification Search
CPC ... C04B 24/26; C04B 20/1033; C04B 28/147; C04B 28/16; C04B 40/0028; C04B 2111/00482; C04B 2111/0062; C04B 2111/00939; C04B 2111/72; C04B 2111/60; C04B 2111/62
See application file for complete search history.

(56) References Cited

U.S. PATENT DOCUMENTS

| | | | |
|---|---|---|---|
| 4,203,877 A | 5/1980 | Baker | |
| 4,528,321 A | 7/1985 | Allen et al. | |
| 4,725,665 A | 2/1988 | Pieh et al. | |
| 5,798,425 A | 8/1998 | Albrecht et al. | |
| 6,211,317 B1 | 4/2001 | Albrecht et al. | |
| 6,437,027 B1 | 8/2002 | Isomura et al. | |
| 6,569,924 B2 | 5/2003 | Shendy et al. | |
| 6,620,879 B1 | 9/2003 | Albrecht et al. | |
| 6,730,162 B1 * | 5/2004 | Li | .......................... C04B 28/14 |
| | | | 106/695 |
| 6,869,988 B2 | 3/2005 | Schwartz et al. | |
| 6,946,510 B2 | 9/2005 | Suau et al. | |
| 7,973,110 B2 | 7/2011 | Lorenz et al. | |
| 7,994,259 B2 | 8/2011 | Sulser et al. | |
| 8,242,218 B2 | 8/2012 | Lorenz et al. | |
| 8,273,814 B2 | 9/2012 | Sulser et al. | |
| 8,349,979 B2 | 1/2013 | Hommer et al. | |
| 8,481,116 B2 | 7/2013 | Bleibler et al. | |

(Continued)

FOREIGN PATENT DOCUMENTS

| | | |
|---|---|---|
| CN | 101962273 A | 2/2011 |
| DE | 29 48 698 A1 | 6/1981 |

(Continued)

*Primary Examiner* — Robert Jones, Jr.
(74) *Attorney, Agent, or Firm* — Oblon, McClelland, Maier & Neustadt, L.L.P.

(57) ABSTRACT

The invention relates to a pulverulent composition comprising, based on the overall mass of the composition, A) at least 20 wt % of a calcium sulfate-based binder and B) 0.01 to 4 wt % of at least one copolymer obtainable by polymerizing a mixture of monomers comprising (I) at least one ethylenically unsaturated monomer which comprises at least one radical from the series carboxylic acid, carboxylic salt, carboxylic ester, carboxylic amide, carboxylic anhydride, and carboxylic imide and (II) at least one ethylenically unsaturated monomer having a polyalkylene oxide radical, the pulverulent composition being producible by a method in which a powder component comprising a calcium sulfate-based binder is contacted with a liquid hydrous component comprising less than 30 wt % of an organic solvent, comprising B), the liquid hydrous component being used in an amount of less than 20 wt %, based on the overall mass of the pulverulent composition, and the pulverulent composition comprising no hydraulic binder. A binder composition comprising an inventive pulverulent composition is also disclosed.

16 Claims, No Drawings

(56) References Cited

U.S. PATENT DOCUMENTS

| | | | |
|---|---|---|---|
| 8,519,029 B2 | 8/2013 | Lorenz et al. | |
| 2004/0266932 A1* | 12/2004 | Mosquet | C04B 24/2647 524/436 |
| 2005/0143511 A1 | 6/2005 | Suau et al. | |
| 2009/0199741 A1* | 8/2009 | Bleibler | C04B 20/10 106/705 |
| 2011/0040025 A1 | 2/2011 | Deroo et al. | |

FOREIGN PATENT DOCUMENTS

| | | |
|---|---|---|
| DE | 35 30 258 A1 | 2/1987 |
| DE | 195 13 126 A1 | 10/1996 |
| DE | 198 34 173 A1 | 2/1999 |
| DE | 199 05 488 A1 | 8/2000 |
| EP | 0 000 424 A1 | 1/1979 |
| EP | 0 126 528 A2 | 11/1984 |
| EP | 0 287 138 A1 | 9/1988 |
| EP | 1 052 232 A1 | 11/2000 |
| EP | 1 577 327 A1 | 9/2005 |
| EP | 1 889 858 A1 | 2/2008 |
| EP | 2 020 422 A1 | 2/2009 |
| WO | 01/42162 A1 | 6/2001 |
| WO | 01/96007 A1 | 12/2001 |
| WO | 2006/027363 A1 | 3/2006 |
| WO | 2006/084588 A2 | 8/2006 |
| WO | 2006/133933 A2 | 12/2006 |

* cited by examiner

RAPIDLY SUSPENDABLE PULVERULENT COMPOSITION

The invention relates to a rapidly suspendable pulverulent composition comprising a calcium sulfate-based binder and at least one copolymer.

In order to achieve improved workability, i.e., kneadability, spreadability, sprayability, pumpability, or flowability, for inorganic suspensions of solids, such suspensions are often admixed with admixtures in the form of dispersants or plasticizers.

Inorganic solids of these kinds in the construction industry usually comprise inorganic binders such as, for example, cement based on Portland cement (EN 197), cement with particular qualities (DIN 1164), white cement, calcium aluminate cement or high-alumina cement (EN 14647), calcium sulfoaluminate cement, specialty cements, calcium sulfate n-hydrate (n=0 to 2), lime or building lime (EN 459) and also pozzolans and latent hydraulic binders such as flyash, metakaolin, silica dust, and slag sand, for example. The inorganic suspensions of solids generally further comprise fillers, more particularly aggregate consisting of, for example, calcium carbonate, quartz, or other natural rocks in different granular sizes and granular morphologies, and also further inorganic and/or organic additives (admixtures) for the targeted influencing of properties of chemical-based construction products, such as hydration kinetics, rheology, or air content, for example. Additionally it is possible for organic binders to be present, such as latex powders, for example.

In order to convert building material mixtures, especially those based on inorganic binders, into a ready-to-use, workable form, it is generally necessary to use substantially more mixing water than theoretically required for the subsequent hydration or hardening process. The void fraction in the building element, formed by the excess water that subsequently evaporates, results in significantly impaired mechanical strength, stability, and durability of adhesion.

In order to reduce this excess water fraction in the case of a given working consistency and/or in order to improve the workability in the case of a given water/binder ratio, admixtures are used which within the construction chemicals segment are generally referred to as water reducers or plasticizers. Known such admixtures include, in particular, polycondensation products based on naphthalenesulfonic or alkylnaphthalenesulfonic acids, or melamine-formaldehyde resins containing sulfonic acid groups.

DE 3530258 describes the use of water-soluble sodium naphthalenesulfonic acid-formaldehyde condensates as admixtures for inorganic binders and building materials. These admixtures are described for improving the flowability of the binders such as cement, anhydrite, or gypsum, for example, and also the building materials produced using them.

In addition to the purely anionic plasticizers, which comprise essentially carboxylic acid groups and sulfonic acid groups, a more recent group of plasticizers described comprises weakly anionic comb polymers, which typically carry anionic charges on the main chain and include nonionic polyalkylene oxide side chains.

WO 01/96007 describes these weakly anionic plasticizers and grinding assistants for aqueous mineral suspensions, which are prepared by radical polymerization of monomers containing vinyl groups and which include polyalkylene oxide groups as a main component.

The aim of adding plasticizers in the construction industry is either to increase the plasticity of the binder system or to reduce the amount of water required under identical processing conditions.

It has emerged that plasticizers based on lignosulfonate, melaminesulfonate, and polynaphthalenesulfonate are significantly inferior in their activity to the weakly anionic, polyalkylene oxide-containing copolymers. These copolymers are also referred to as polycarboxylate ethers (PCEs). Polycarboxylate ethers not only disperse the inorganic particles via electrostatic charging, owing to the anionic groups (carboxylate groups, sulfonate groups) present on the main chain, but also, furthermore, stabilize the dispersed particles by steric effects, owing to the polyalkylene oxide side chains, which by absorbing water molecules form a stabilizing protective layer around the particles.

As a result, it is either possible to reduce the required amount of water for the formulating of a particular consistency, as compared with the conventional plasticizers, or else the addition of the polycarboxylate ethers reduces the plasticity of the wet building-material mixture to such an extent that it is possible to produce self-compacting mortar with low water/binder ratios.

Furthermore, DE 199 05 488 discloses pulverulent polymer compositions based on polyether carboxylates, comprising 5 to 95 wt % of the water-soluble polymer and 5 to 95 wt % of a finely divided mineral carrier material. The products are produced by contacting the mineral carrier material with a melt or an aqueous solution of the polymer. Advantages touted for this product in comparison to spray-dried products include a significantly enhanced resistance toward sticking and accretion.

WO 2006/027363 discloses a method for producing a coated base material for a hydraulic composition. Disclosures in the examples include the coating of a Portland cement with 1% of an aqueous polycarboxylate ether solution, based on the binder weight.

Dispersants based on polycarboxylate ethers and derivatives thereof are available either as solids in powder form or as aqueous solutions. Polycarboxylate ethers in powder form can be admixed to a factory dry-mix mortar, for example, in the course of its production. When the factory dry-mix mortar is batched with water, the polycarboxylate ethers dissolve and are able subsequently to develop their effect.

Alternatively it is also possible to add polycarboxylate ethers or derivatives thereof to the inorganic suspension of solids in dissolved form. The dispersant is more particularly metered directly into the mixing water.

A disadvantage of all existing methods for incorporating plasticizers into a suspension of solids based on a calcium sulfate-based binder, however, is that the dispersing effect does not develop immediately after addition of the mixing water. Irrespective of whether the dispersant is added as a powder or in aqueous solution with the mixing water, it may take more than 100 seconds, for example, in a dry-mix mortar—depending on water-to-binder ratio or water demand—for a homogeneous suspension to form with vigorous stirring after the addition of the mixing water. This delay is a problem particularly in the context of the use of mixing pumps.

It was an object of the present invention, accordingly, to provide pulverulent compositions based on calcium sulphate-based binder that can be homogeneously dispersed with water more rapidly than has been possible with the existing compositions.

This object has been achieved by means of a pulverulent composition comprising, based on the overall mass of the composition,
A) at least 20 wt %, more particularly at least 40 wt %, preferably at least 60 wt %, and especially preferably at least 80 wt % of a calcium sulfate-based binder and
B) 0.01 to 4 wt %, more particularly 0.05 to 3, more preferably 0.1 to 2 wt % of at least one copolymer obtainable by polymerizing a mixture of monomers comprising
  (I) at least one ethylenically unsaturated monomer which comprises at least one radical from the series carboxylic acid, carboxylic salt, carboxylic ester, carboxylic amide, carboxylic anhydride, and carboxylic imide and
  (II) at least one ethylenically unsaturated monomer having a polyalkylene oxide radical,
the pulverulent composition being producible by a method in which a powder component comprising a calcium sulfate-based binder is contacted with a liquid hydrous component comprising less than 30 wt % of an organic solvent, comprising B), the liquid hydrous component being used in an amount of less than 20 wt %, more particularly less than 15 wt %, preferably less than 10 wt %, and especially preferably less than 5 wt %, based on the overall mass of the pulverulent composition, and the pulverulent composition comprising no hydraulic binder.

Surprisingly it has emerged here that not only has it been possible to achieve the stated object in full but also the pulverulent composition, as well as the outstanding dispersibility, has excellent working properties at the same time, with improvement possible in the pumpability and with reduction possible in the electrical power required for the mixing operation. In particular it has also been found that the pulverulent composition of the invention exhibits a smaller change in the water demand over time, this being a great advantage for numerous applications.

The copolymers in accordance with the present invention comprise at least two monomer units. It may, though, also be advantageous to use copolymers having three or more monomer units.

In one preferred embodiment, the ethylenically unsaturated monomer (I) is represented by at least one of the following general formulae from the group (Ia), (Ib), and (Ic):

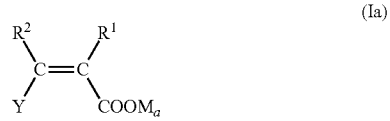

(Ia)

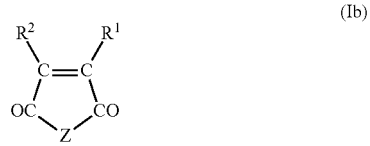

(Ib)

For the monocarboxylic or dicarboxylic acid derivative (Ia) and for the monomer (Ib) in cyclic form, where Z represents O (acid anhydride) or $NR^2$ (acid imide), $R^1$ and $R^2$ independently of one another are hydrogen or an aliphatic hydrocarbon radical having 1 to 20 C atoms, preferably a methyl group. Y is H, $-COOM_a$, $-CO-O(C_qH_{2q}O)_r-R^3$, or $-CO-NH-(C_qH_{2q}O)_r-R^3$.

M is hydrogen, a monovalent or divalent metal cation, preferably sodium, potassium, calcium, or magnesium ion, additionally ammonium or an organic amine radical, and a=½ or 1, according to whether M is a monovalent or a divalent cation. Organic amine radicals used are preferably substituted ammonium groups deriving from primary, secondary, or tertiary $C_{1-20}$ alkylamines, $C_{1-20}$ alkanolamines, $C_{5-8}$ cycloalkylamines, and $C_{6-14}$ arylamines. Examples of the amines in question are methylamine, dimethylamine, trimethylamine, ethanolamine, diethanolamine, triethanolamine, methyldiethanolamine, cyclohexylamine, dicyclohexylamine, phenylamine, and diphenylamine in the protonated (ammonium) form.

$R^3$ is hydrogen, an aliphatic hydrocarbon radical having 1 to 20 C atoms, a cycloaliphatic hydrocarbon radical having 5 to 8 C atoms, an aryl radical having 6 to 14 C atoms, it being possible optionally for this radical to be substituted, q=2, 3, or 4, and r=0 to 200, preferably 1 to 150. The aliphatic hydrocarbons here may be linear or branched and also saturated or unsaturated. Preferred cycloalkyl radicals are considered to be cyclopentyl or cyclohexyl radicals, and preferred aryl radicals are considered to be phenyl or naphthyl radicals, which in particular may also be substituted by hydroxyl, carboxyl, or sulfonic acid groups.

The following formula represents the monomer (Ic):

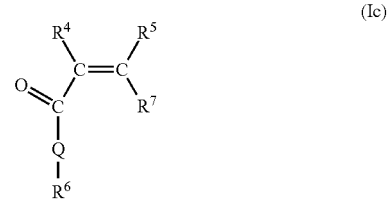

(Ic)

In this formula, $R^4$ and $R^5$ independently of one another are hydrogen or an aliphatic hydrocarbon radical having 1 to 20 C atoms, a cycloaliphatic hydrocarbon radical having 5 to 8 C atoms, or an optionally substituted aryl radical having 6 to 14 C atoms. Q may be identical or different and is represented by NH, $NR^3$, or O, with $R^3$ possessing the definition stated above.

Furthermore, $R^6$ is identical or different and is represented by $(C_nH_{2n})-SO_3H$ with n=0, 1, 2, 3, or 4, $(C_nH_{2n})-OH$ with n=0, 1, 2, 3, or 4; $(C_nH_{2n})-PO_3H_2$ with n=0, 1, 2, 3, or 4, $(C_nH_{2n})-OPO_3H_2$ with n=0, 1, 2, 3, or 4, $(C_6H_4)-SO_3H$, $(C_6H_4)-PO_3H_2$, $(C_6H_4)-OPO_3H_2$, and $(C_nH_{2n})-NR^8_b$ with n=0, 1, 2, 3, or 4 and b=2 or 3.

$R^7$ is H, $-COOM_a$, $-CO-O(C_qH_{2q}O)_r-R^3$, or $-CO-NH-(C_qH_{2q}O)_r-R^3$, where $M_a$, $R^3$, q, and r possess the definitions stated above.

$R^8$ is hydrogen, an aliphatic hydrocarbon radical having 1 to 10 C atoms, a cycloaliphatic hydrocarbon radical having 5 to 8 C atoms, or an optionally substituted aryl radical having 6 to 14 C atoms.

With further preference in the sense of the present invention, the ethylenically unsaturated monomer (II) is represented by the following general formula:

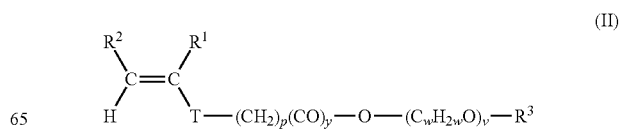

(II)

where p is an integer between 0 and 6, y is 0 or 1, v is an integer between 3 and 500, and w independently at each occurrence for each $(C_wH_{2w}O)$ unit is identical or different and is an integer between 2 and 18, and also T is oxygen or a chemical bond. $R^1$, $R^2$, and $R^3$ possess the definition stated above.

In one preferred embodiment, in the general formula (II), p is an integer between 0 and 4, v is an integer between 5 and 250, and w independently at each occurrence for each $(C_wH_{2w}O)$ unit is identical or different and is 2 or 3.

In one particularly preferred embodiment, in the general formula (II), p is 4, v is an integer between 10 and 120, and w independently at each occurrence for each $(C_wH_{2w}O)$ unit is identical or different and is 2 or 3, T is oxygen, and y is 0. In this case it is particularly preferred for at least one subregion to be formed by a random ethylene oxide/propylene oxide copolymer and for the molar fraction of propylene oxide units to be preferably 10 to 30 mol %, based on the sum of the ethylene oxide units and propylene oxide units in the random ethylene oxide/propylene oxide copolymer or in the corresponding subregion.

More particularly the at least one ethylenically unsaturated monomer having a polyalkylene oxide radical (II) may be a compound of the formula (III). The block A consists of a polyethylene oxide unit, with n preferably representing a number from 20 to 30. The block B consists of a random ethylene oxide/propylene oxide copolymer unit, with k preferably representing a number from 5 to 10 and l preferably representing a number from 20 to 35.

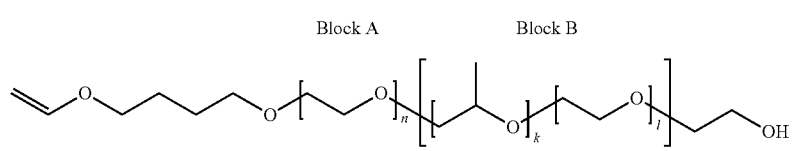

(III)

In a further-preferred embodiment of the invention, the ethylenically unsaturated monomer (II) comprises at least one compound of the general formulae (IV), (V), (VI), and (VII),

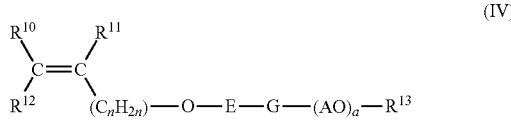

(IV)

where
$R^{10}$, $R^{11}$, and $R^{12}$ are each identical or different and independently of one another are represented by H and/or an unbranched or branched $C_1$-$C_4$ alkyl group, preferably H and/or $CH_3$;

E is identical or different and is represented by an unbranched or branched $C_1$-$C_6$ alkylene group, more particularly $C_1$, $C_2$, $C_3$, $C_4$, $C_5$, or $C_6$, admittedly in each case typically, but preferably $C_2$ and $C_4$, a cyclohexyl group, $CH_2$—$C_6H_{10}$, $C_6H_4$ present in ortho, meta, or para substituted form, and/or an absent unit, i.e., E is not present;

G is identical or different and is represented by O, NH and/or CO—NH, with the proviso that if E is an absent unit, G is also an absent unit, i.e., G is not present;

A is identical or different and is represented by $C_xH_{2x}$ with x=2, 3, 4, and/or 5, preferably x=2, and/or $CH_2CH(C_6H_5)$;

n is identical or different and is represented by 0, 1, 2, 3, 4 and/or 5;

a is identical or different and is represented by an integer from 2 to 350, preferably 10-200;

$R^{13}$ is identical or different and is represented by H, an unbranched or branched $C_1$-$C_4$ alkyl group, CO—$NH_2$, and/or $COCH_3$, preferably H or $CH_3$;

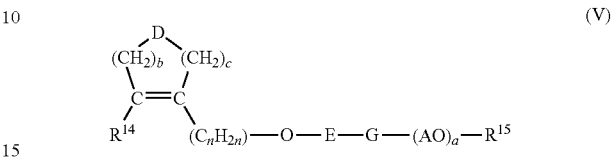

(V)

where
$R^{14}$ is identical or different and is represented by H and/or an unbranched or branched $C_1$-$C_4$ alkyl group, preferably H;

E is identical or different and is represented by an unbranched or branched $C_1$-$C_6$ alkylene group, preferably $C_2H_4$, a cyclohexyl group, $CH_2$—$C_6H_{10}$, $C_6H_4$ present in ortho, meta, or para substituted form, and/or by an absent unit, i.e., E is not present;

G is identical or different and is represented by an absent unit, O, NH and/or CO—NH, with the proviso that if E is an absent unit, G is also an absent unit, i.e., G is not present;

A is identical or different and is represented by $C_xH_{2x}$ with x=2, 3, 4, and/or 5, preferably x=2, and/or $CH_2CH(C_6H_5)$;

n is identical or different and is represented by 0, 1, 2, 3, 4 and/or 5;

a is identical or different and is represented by an integer from 2 to 350, preferably 10-200;

D is identical or different and is represented by an absent unit, i.e., D is not present, or by NH and/or O, with the proviso that if D is an absent unit: b=0, 1, 2, 3, or 4 and also c=0, 1, 2, 3, or 4, with b+c=3 or 4, and with the proviso that if D is NH and/or O: b=0, 1, 2, or 3, c=0, 1, 2, or 3, and b+c=2 or 3;

$R^{15}$ is identical or different and is represented by H, an unbranched or branched $C_1$-$C_4$ alkyl group, CO—$NH_2$, and/or $COCH_3$, preferably H;

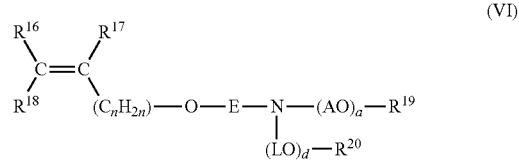

(VI)

where
$R^{16}$, $R^{17}$, and $R^{18}$ are each identical or different and independently of one another are represented by H and/or an unbranched or branched $C_1$-$C_4$ alkyl group, preferably H and/or $CH_3$;

E is identical or different and is represented by an unbranched or branched $C_1$-$C_6$ alkylene group, preferably $C_2H_4$ or $C_4H_8$, a cyclohexyl group, $CH_2$—$C_6H_{10}$, $C_6H_4$ present in ortho, meta, or para substituted form, and/or by an absent unit, i.e., E is not present;

A is identical or different and is represented by $C_xH_{2x}$ with x=2, 3, 4 and/or 5, preferably x=2, and/or $CH_2CH(C_6H_5)$;

n is identical or different and is represented by 0, 1, 2, 3, 4 and/or 5;

L is identical or different and is represented by $C_xH_{2x}$ with x=2, 3, 4 and/or 5, preferably x=2, and/or $CH_2$—$CH(C_6$—$H_5)$;

a is identical or different and is represented by an integer from 2 to 350, preferably 10-200;

d is identical or different and is represented by an integer from 1 to 350, preferably 10-200;

$R^{19}$ is identical or different and is represented by H and/or an unbranched or branched $C_1$-$C_4$ alkyl group, preferably H, $R^{20}$ is identical or different and is represented by H and/or an unbranched $C_1$-$C_4$ alkyl group, preferably H.

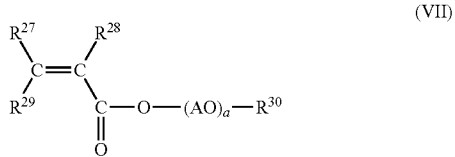

(VII)

in which $R^{27}$, $R^{28}$, and $R^{29}$ are identical or different and independently of one another are H and/or an unbranched or branched $C_1$-$C_4$ alkyl radical;

A are identical or different and denote $C_xH_{2x}$ with x=2, 3, 4 and/or 5 and/or $CH_2CH(C_6H_5)$;

a are identical or different and are an integer between 2 and 350;

$R^{30}$ are identical or different and are H and/or an unbranched or branched $C_1$-$C_4$ alkyl radical.

Generally it can be said that the polyalkoxy side chains $(AO)_a$ of the polyether macro-monomers are very preferably pure polyethoxy side chains, although there may preferably also be mixed polyalkoxy side chains present, more particularly those which contain both propoxy groups and ethoxy groups.

In practice the polyether macromonomer frequently used is alkoxylated isoprenol, i.e., alkoxylated 3-methyl-3-buten-1-ol, and/or alkoxylated hydroxybutyl vinyl ether and/or alkoxylated (meth)allyl alcohol, with allyl alcohol being preferred over methallyl alcohol, having normally in each case an arithmetically mean number of oxyalkylene groups of 4 to 350. Particularly preferred is alkoxylated hydroxybutyl vinyl ether.

Besides the monomers (I) and (II) there may also be further types of monomer employed in the copolymer of the invention. In one particularly preferred embodiment, however, the copolymer of the invention comprises no styrene or derivatives of styrene as monomers.

The molar fraction of the monomers (I) and (II) in the copolymer of the invention may be selected freely within wide ranges. It has proven particularly advantageous if the fraction of the monomer (I) in the copolymer is 5 to 95 mol %, preferably 30 to 95 mol %, and particularly 55 to 95 mol %. In a further-preferred embodiment, the fraction of the monomer (II) in the copolymer is 1 to 89 mol %, more particularly 1 to 55 mol %, and more preferably 1 to 30 mol %.

It is considered preferable here for the monomer (II) to have a molecular weight of 500 to 10 000 g/mol.

In one further preferred embodiment, the copolymer of the invention possesses a molecular weight of 12 000 to 75 000 g/mol, determined by gel permeation chromatography against polyethylene glycol standards.

Water is a particularly suitable solvent when preparing the copolymers of the invention. It is, though, also possible to use a mixture of water and an organic solvent, in which case the solvent ought to be very largely inert in its behaviour with respect to radical polymerization reactions. With regard to the organic solvents, the organic solvents already identified above, in particular, are considered to be particularly suitable.

The polymerization reaction takes place preferably in the temperature range between 0 and 180° C., more preferably between 10 and 100° C., and also under atmospheric pressure or under elevated or reduced pressure. The polymerization may optionally also be performed under an inert gas atmosphere, preferably under nitrogen.

To initiate the polymerization it is possible to use high-energy electromagnetic radiation, mechanical energy, or chemical polymerization initiators such as organic peroxides, examples being benzoyl peroxide, tert-butyl hydroperoxide, methyl ethyl ketone peroxide, cumoyl peroxide, dilauroyl peroxide, or azo initiators, such as azodiisobutyronitrile, azobisamidopropyl hydrochloride, and 2,2'-azobis (2-methyl-butyronitrile), for example. Likewise suitable are inorganic peroxy compounds, such as ammonium peroxodisulfate, potassium peroxodisulfate, or hydrogen peroxide, for example, optionally in combination with reducing agents (e.g., sodium hydrogensulfite, ascorbic acid, iron(II) sulfate) or redox systems, which as reducing component comprise an aliphatic or aromatic sulfonic acid (e.g., benzenesulfonic acid, toluenesulfonic acid).

Particular preference is given to a mixture of at least one sulfinic acid with at least one iron(II) salt, and/or a mixture of ascorbic acid with at least one iron(II) salt.

Chain transfer agents used, which regulate the molecular weight, are the customary compounds. Suitable known such agents are, for example, alcohols, such as methanol, ethanol, propanol, isopropanol, n-butanol, sec-butanol, and amyl alcohols, aldehydes, ketones, alkylthiols, such as dodecylthiol and tert-dodecylthiol, for example, thioglycolic acid, isooctyl thioglycolate, 2-mercaptoethanol, 2-mercaptopropionic acid, 3-mercaptopropionic acid, and some halogen compounds, such as carbon tetrachloride, chloroform, and methylene chloride, for example.

The copolymers of the invention may also be prepared by polymer-analogous reactions. In such cases, a polymer which contains latent or free carboxyl groups is reacted with one or more compounds which contain amine or hydroxyl functions, under conditions which lead to partial amidation or esterification of the carboxyl groups, respectively.

The liquid hydrous component may also comprise organic solvents. More particularly the liquid hydrous component may comprise less than 30 wt % of an organic solvent, preferably less than 10 wt %, and more particularly no organic solvent.

Serving as organic solvent may be, preferably, all organic solvents in which the copolymer of the invention has a good solubility. The solubility of the copolymer is dependent on the monomers selected specifically and on the proportions of the monomers employed, and may be ascertained by means of simple experiments. More particularly the solvent in question is at least one solvent from the series ethyl acetate, n-butyl acetate, 1-methoxy-2-propyl acetate, ethanol, isopropanol, n-butanol, 2-ethyl-hexanol, 1-methoxy-2-propanol, ethylene glycol, propylene glycol, acetone, butanone, pentanone, hexanone, methyl ethyl ketone, ethyl acetate, butyl acetate, amyl acetate, tetrahydrofuran, diethyl ether, toluene, xylene, or higher-boiling alkylbenzenes. The solvent may further be polyethylene glycol ethers or polypropylene glycol ethers or random ethylene oxide/propylene oxide copolymers having an average molar mass of between 200 and 2000 g/mol, mono-, di-, or triethylene glycol, mono-, di-, or tripropylene glycol, methyl, ethyl, propyl, butyl, or higher alkyl polyalkylene glycol ethers having 1, 2, 3, or more ethylene glycol and/or propylene glycol units, as for example methoxypropanol, dipropylene glycol monomethyl ether, tripropylene glycol monomethyl ether, ethylene glycol monobutyl ether, diethylene glycol monobutyl ether, butyl polyethylene glycol ether, propyl polyethylene glycol ether, ethyl polyethylene glycol ether, methyl polyethylene glycol ether, dimethyl polyethylene glycol ether, dimethyl polypropylene glycol ether, glycerol ethoxylates having a molecular weight of 200 to 20 000 g/mol, pentaerythritol alkoxylates, ethylene carbonate, propylene carbonate, glycerol carbonate, glycerol formal, and 2,3-O-isopropylideneglycerol. With more particular preference the solvent comes from alkyl polyalkylene glycol ethers and more preferably methyl polyethylene glycol ether and also polyethylene glycol ethers, polypropylene glycol ethers, and random ethylene oxide/propylene oxide copolymers having an average molar mass of between 200 and 2000 g/mol. Further preferred are solvents based on carbonates, more particularly ethylene carbonate, propylene carbonate, and glycerol carbonate. With particular preference the liquid hydrous component comprises no solvent.

The water content of the liquid hydrous component of the invention is preferably >5 wt %, more particularly >30 wt %. More particularly the water content may be between 10 and 99 wt %, preferably between 15 and 70 wt %, and more preferably between 20 and 50 wt % of the liquid component.

In order to maximize the rapidity with which the pulverulent composition of the invention can be suspended, it is advantageous for the at least one copolymer of the invention to be present, in the liquid hydrous component, in dissolved form to an extent of at least 50 wt %, preferably at least 80 wt %, and more preferably at least 99 wt %. More particularly the copolymer is in solution in the liquid component.

The contacting of the powder component with the liquid component comprising the copolymer of the invention may be accomplished in any manner known for such an operation to the skilled person. It has proven to be particularly suitable for the liquid component to be contacted with the powder component by spraying on or atomizing. The method preferably includes a mixing step, with the powder component being subjected to a mixing step during and/or after the contacting with the liquid hydrous component. In this way it is easy to ensure homogeneous application in conjunction with good adhesion, including initial adhesion. The contacting of the powder component with the liquid component can of course also take place in any other suitable way. Options contemplated here include, in particular, blending or stirring in, although spray application is clearly preferential, since it represents the most simple and most economically attractive form of application. In a preferred embodiment the method, after the addition of the liquid hydrous component, comprises no physical drying step.

In one particularly preferred embodiment, according to the intended use, it is also possible for other additives to be admixed to the liquid hydrous component, said additives being preferably in dissolved form. Based on the overall mixture, more particularly, the liquid component may comprise 0.5 to 95 wt %, more particularly 1 to 50 wt %, of at least one further additive. As a result it is possible for the pulverulent composition to be simply admixed with further additives, this representing a particularly economical procedure. Through the particularly homogeneous distribution of the further additive, its effect directly after mixing with water can be improved, and this is considered a further advantage of this embodiment.

In a further-preferred embodiment, the liquid hydrous component consists of a solution of the copolymer of the invention in water.

It is preferred for the pulverulent composition to have an average particle size of between 0.1 and 1000 μm, more preferably between 1 and 200 μm. The particle size here is determined preferably by means of laser diffractometry.

The calcium sulfate-based binder may be present in various stages of hydration. Preferred binders of the invention are calcium sulphate α-hemihydrate, calcium sulfate β-hemihydrate, and the anhydrite, which is free from water of crystallization, or mixtures of the stated binders. Particularly preferred is calcium sulfate β-hemihydrate, and more particularly calcium sulfate β-hemihydrate comprising anhydrite, more particularly anhydrite III. Also possible for use is anhydrite dust (finely ground anhydrite), which is relatively slow to react and which sets only partially.

The expression "gypsum" is used synonymously in the present context with calcium sulfate, and the calcium sulfate may be present in its various anhydrous and hydrated forms with and without water of crystallization. Natural gypsum substantially comprises calcium sulfate dihydrate ("dihydrate"). The natural form of calcium sulfate, free from water of crystallization, is encompassed by the expression "anhydrite". As well as the naturally occurring forms, calcium sulfate is a typical byproduct of industrial operations, and is then referred to as "synthetic gypsum". One typical example of a synthetic gypsum from industrial operations is flue gas desulfurization. Synthetic gypsum, however, may equally also be formed as the byproduct of phosphoric acid or hydrofluoric acid production processes. Typical gypsum ($CaSO_4 \times 2H_2O$) can be calcined, with the water of crystallization being removed. Products of the wide variety of different calcination processes are α- or β-hemihydrate.

Calcium sulfate β-hemihydrate results from rapid heating in open vessels, accompanied by rapid evaporation of water, forming voids. α-Calcium sulfate hemihydrate may be produced by the dewatering of gypsum in closed autoclaves. The crystal form in this case is relatively impervious, and so this binder requires less water for liquefaction than does calcium sulfate β-hemihydrate. On the other hand, hemihydrate undergoes rehydration with water to form dihydrate crystals. Gypsum hydration customarily takes from several minutes to hours, resulting in a shortened working time in comparison to cements, which require several hours to days for complete hydration. These qualities make gypsum a useful alternative to cements as binders in a wide variety of applications. Moreover, fully cured gypsum products exhibit pronounced hardness and compressive strength.

The form selected for a wide variety of applications is calcium sulfate β-hemihydrate, since it has better availability and exhibits numerous advantages from an economic standpoint. These advantages, however, are in part negated by the greater water demand of calcium sulfate β-hemihydrate in use in order for fluid suspensions to be obtained at all. Moreover, the dried gypsum products produced therefrom tend to have a certain weakness, which can be attributed to quantities of residual water which have remained in the crystal matrix on curing. For this reason, corresponding products exhibit less hardness than gypsum products prepared with smaller amounts of mixing water.

Gypsum for the purposes of the present invention, therefore, is more preferably calcium sulfate β-hemihydrate. Calcium sulfate β-hemihydrate of the invention is especially suitable here for use in gypsum-based self-levelling screed.

The formulation of gypsum-based self-levelling screeds has to date been possible only with binders based on anhydrite or calcium sulfate α-hemihydrate. Binders of these kinds represent gypsum modifications which have a very low water demand and are therefore high-strength binders. Nevertheless, both in terms of price and in terms of availability, the two components display distinct disadvantages relative to calcium sulfate β-hemihydrate. The use of β-hemihydrate, however, is not possible according to the prior art, since the high water demand means that the resulting strengths are too low to produce a self-levelling screed in sufficient quality.

It has emerged that plasticizers based on lignosulfonate, melaminesulfonate, and polynaphthalene sulfonate are not able adequately to reduce the water demand of calcium sulfate β-hemihydrate.

The use of polycarboxylate ethers allows sufficient reduction of water, but the development rate of polycarboxylate ethers conforming to the prior art is too slow for machine-applied self-levelling screeds.

In the processing of a screed mixture of this kind with a machine, there is a sharp increase in viscosity at the start, and so the mixture either can no longer be processed homogeneously or else the operator on the building site compensates for the viscosity by adding water, in which case there is separation in the material. Furthermore, the excess water, which later evaporates, results in significantly impaired mechanical strength, stability, and durability of adhesion.

Machine-applied, gypsum-based, self-levelling screeds based on calcium sulfate β-hemihydrate of the invention can be worked, in contrast, like the anhydrite- or calcium sulfate α-hemihydrate-based self-levelling, gypsum-based screeds known in the prior art, and have comparable or even better mechanical strength, stability, and durability of adhesion.

Another disadvantage associated with the use of calcium sulfate β-hemihydrate is that rapid heating during the production of the binder often causes an "overcalcining" which is accompanied by formation of anhydrite III, which through contact with water or atmospheric moisture undergoes reaction to give the hemihydrate again. A consequence of this is that the freshly calcined binder has a higher water demand than the same binder that has been stored for a prolonged period. This ageing effect, which is manifested in an altered water demand, can be accelerated artificially by contacting the binder, calcium sulfate β-hemihydrate for example, with water directly after the calcining operation, so that the anhydrite III is immediately reacted to form the hemihydrate.

If, for the production process, the freshly calcined powder component in the form of calcium sulfate β-hemihydrate is brought into contact—by atomizing, for example—with the liquid component of the invention that comprises the copolymer, this ageing effect may be achieved directly, and this in turn is manifested positively in a reduced water demand by the binder. It is therefore considered particularly advantageous for the calcium sulfate-based binder of the powder component to comprise freshly calcined calcium sulfate β-hemihydrate.

On addition of water, the abovementioned calcium sulfate-based binders are hydrated, forming calcium sulfate dihydrate. Calcium sulfate dihydrate forms acicular crystals, which exhibit merged growth and adhere to one another. As a result, gypsum products of pronounced hardness and compressive strength may be obtained.

The pulverulent composition, based on the overall mass of the composition, comprises preferably between 85 and 99.99 wt % of the calcium sulphate-based binder.

Further envisaged is the use of a composition of the invention as a binder for gypsum plasterboard, screeds, static or self-levelling filling compounds, plasters, renders, and modelling materials.

A further aspect of the present invention is a binder composition comprising a pulverulent composition of the invention and also at least one further binder from the series cement based on Portland cement, white cement, calcium aluminate cement, calcium sulfoaluminate cement, and latent hydraulic and/or pozzolanic binders. In one preferred embodiment, the further binders in the compositions of the invention may comprise a mixture of Portland cement and calcium aluminate cement, in which case, more particularly, the calcium aluminate cement used may comprise fused alumina cement.

For the purposes of the present invention, the pulverulent composition of the invention is mixed with the at least one further binder and optionally with fillers and/or additives in order thereby to give, for example, masonry mortars, render mortars, jointing mortars, tile adhesives, thin-bed mortars, screed mortars, casting mortars, injection mortars, filling compounds, or lining mortars (e.g., for pipes for drinking water). Particularly rapid homogeneous dispersibility of the compositions thus produced with water is also achieved by this procedure.

The binder composition of the invention is preferably a factory dry-mix mortar. As a result of continual efforts toward substantial rationalization and improved product quality, mortars for a wide variety of uses in the construction sector are nowadays virtually no longer mixed together on the site itself from the starting materials. This function is nowadays largely carried out at the factory in the construction materials industry, and the ready-to-use mixtures are supplied in the form of what are called factory dry-mix mortars. Completed mixtures which are made workable on site exclusively by addition of water and commixing are referred to according to DIN 18557 as factory mortars, more particularly as factory dry-mix mortars. Mortar systems of this kind may fulfil any of a very wide variety of physical construction objectives. Depending on the objective that exists, the binder, which may comprise cement and/or lime and/or calcium sulfate, for example, is admixed with further additives or admixtures in order to adapt the factory dry-mix mortar to the specific application. The additives and admixtures in question may include, for example, shrinkage reducers, expansion agents, accelerators, retardants, dispersants, thickeners, defoamers, air entrainers, corrosion inhibitors, and hydrophobizing agents.

In one particular embodiment, the factory dry-mix mortar of the invention may also be a self-levelling underlayment composition. This is particularly advantageous since pulverulent compositions of this kind, for low layer thicknesses, are generally very fine and their mixing-up with water is therefore comparatively slow.

Likewise included are factory dry-mix mortars which when produced on the building site may be provided not only with water but also with further components, more particularly liquid and/or pulverulent additives and/or with aggregates (two-component systems).

The present invention further provides for the use of a liquid hydrous component comprising less than 30 wt % of an organic solvent and comprising a copolymer obtainable by polymerizing a mixture of monomers comprising
(I) at least one ethylenically unsaturated monomer which comprises at least one radical from the series carboxylic acid, carboxylic salt, carboxylic ester, carboxylic amide, carboxylic anhydride, and carboxylic imide and
(II) at least one ethylenically unsaturated monomer having a polyalkylene ether radical, for spraying or atomizing onto a powder component comprising a calcium sulfate-based binder, for accelerating the homogeneous dispersing of the product with water.

A "product" here means not only the product obtained directly by spraying or atomizing onto a powder component, but also a product obtained by subsequently mixing this product with further components, more particularly further binders, fillers, additives and/or admixtures. With more particular preference, again, the monomer (I) comprises the aforementioned compounds of the formulae (Ia), (Ib), and (Ic), and the monomer (II) comprises the aforementioned compound of the formula (II).

The examples which follow are intended to elucidate the invention in more detail.

EXAMPLES

Composition of the Inventive Copolymer

The synthesis of the copolymer used is described for example in WO2006133933 page 12, line 5 to page 13, line 26. The composition of the copolymer used is as follows:

| Copolymer 1 | | | | |
| --- | --- | --- | --- | --- |
| Mol of acrylic acid | Mol of macromonomer | Macro-monomer | Mw (g/mol) | Solids % |
| 5 | 1 | VOBPEG-3000 | 32 000 | 50 |

The abbreviation VOBPEG-3000 stands for vinyloxybutyl-polyethylene glycol with a molar mass of 3000 g/mol.

Determination of Slump

Production of inventive pulverulent composition:

1 kg of calcium sulfate β-hemihydrate (β-HH) is charged to a forced mixer. While the material is mixed at 950 revolutions per minute (rpm), 20 g of a 50 wt % strength aqueous solution of copolymer 1 (active ingredient content: 0.1% based on β-HH) are sprayed on at room temperature over the course of 25 seconds. This is followed by mixing for a further 90 seconds. After a short break in mixing, of a few seconds, the mixture is stirred again for a further 120 seconds.

Inventive Example 1

Use of the inventive pulverulent composition as binder in a gypsum slurry (calcium sulfate paste).

Inventive Example 2

Use of the inventive pulverulent composition as binder in a blend with finely ground limestone (Omyacarb 130 AL) in a ratio of 1:1.

Comparative Example 1

Use of untreated β-HH as binder in a gypsum slurry (for determining the blank value based on the mixture of water and β-HH without plasticizer).

Comparative Example 2

Gypsum slurry, based on untreated β-HH, where the abovementioned 50 wt % strength aqueous solution of copolymer 1 is added to the mixing water.

Comparative Example 3

Gypsum slurry, based on untreated β-HH, where copolymer 1 is added as a powder to the β-HH.

Comparative Example 4

Use of untreated β-HH as binder in a blend with finely ground limestone (Omyacarb 130 AL) in a ratio of 1:1 (for determining the blank value of the blend of untreated β-HH with finely ground limestone, without plasticizer).

Comparative Example 5

Blend of untreated β-HH with finely ground limestone (Omyacarb 130 AL) in a ratio of 1:1, where the abovementioned 50 wt % strength aqueous solution of copolymer 1 is added to the mixing water.

Comparative Example 6

Blend of untreated β-HH with finely ground limestone (Omyacarb 130 AL) in a ratio of 1:1, where copolymer 1 is added as a powder to the dry component.

Application Examples

Investigation of the flow behaviour of the inventive pulverulent composition as pure gypsum slurry or as blend of the inventive pulverulent composition with finely ground limestone (Omyacarb 130AL type).

General Application Example 1

The gypsum slurries are produced using in each case 300 g of β-HH. The quantity of water needed, corresponding to a water-to-binder (w/g) ratio of 0.59 and determined on the basis of the untreated gypsum slurry (comparative example 1), is charged to a mixing vessel (mixer according to DIN EN 196-1) and then the β-HH is sprinkled carefully into the water. In the case of inventive example 1, the β-HH already contains the required amount of plasticizer of 0.1 wt % (copolymer 1); in the case of comparative examples 2) and 3), copolymer 1 is added separately in liquid form in the mixing water or as powder, likewise giving an active ingredient concentration of 0.1 wt %, based on the β-HH employed. In addition, all mixtures contain 0.08 wt % of Retardan P, based on the amount of β-HH used. Stirring takes place for 15 seconds on setting 1 and then for 15 seconds more on setting 2.

To determine the flow behaviour, the mixtures are introduced into a cone (internal diameter of 5 cm and height of 10 cm), and after a period (including mixing operation) of 60 seconds, the slump is determined.

The results of the application tests for inventive example 1 and comparative examples 1 to 3 are set out in table 1 below:

TABLE 1

Investigation of the flow behaviour in a gypsum slurry

|  | Blank value (comparative example 1) | Gypsum slurry + 0.1 wt % copolymer 1 as powder (comparative example 3) | Gypsum slurry + 0.1 wt % copolymer 1 solution (comparative example 2) | Gypsum slurry inventive β-HH (inventive example 1) |
|---|---|---|---|---|
| β-HH (g) | 300 | 300 | 300 | 300 |
| wt % plasticizer based on β-HH | 0 | 0.1 | 0.1 | 0.1 |
| w/g | 0.59 | 0.59 | 0.59 | 0.59 |
| slump (cm) | 14.8 | 19.3 | 21 | 25.9 |

Inventive example 1, comprising the inventive pulverulent composition, displays a marked increase in the slump, of 75% relative to the blank value and of 23% and 34% relative to the use of the plasticizer in the mixing water and as powder, respectively.

Application Example 2

500 g in each case, consisting of a 1:1 blend of β-HH with finely ground limestone, are charged to the mixing vessel of a forced mixer. Stirring takes place at 950 rpm for 60 seconds, with the amount of water required, corresponding to a w/g of 0.87 and determined on the basis of the mixture without plasticizer (comparative example 4), being added after 5-10 seconds. In the case of inventive example 2, the blend already contains the required amount of plasticizer of 0.1 wt % (copolymer 1), based on β-HH.

In the case of comparative examples 5) and 6), copolymer 1 is added separately in liquid form in the mixing water or as powder, likewise in an active ingredient concentration of 0.1 wt %, based on β-HH. In addition, all mixtures contain 0.08 wt % of Retardan P, based on the amount of β-HH used.

To determine the flow behaviour, the mixtures are introduced into a cone (internal diameter of 5 cm and height of 10 cm), and after a period (including mixing operation) of 120 seconds, the slump is determined. The results of the application tests for inventive example 2 and comparative examples 4 to 6 are set out in table 2 below:

TABLE 2

Investigation of the flow behaviour of a 1:1 blend of β-HH with finely ground limestone

|  | Blank value (comparative example 4) | Mixture + 0.1 wt % copolymer 1 as powder (comparative example 6) | Mixture + 0.1 wt % copolymer 1 solution (comparative example 5) | Mixture inventive β-HH (inventive example 2) |
|---|---|---|---|---|
| β-HH (g) | 250 | 250 | 250 | 250 |
| finely ground limestone (g) | 250 | 250 | 250 | 250 |
| wt % plasticizer based on β-HH | 0 | 0.1 | 0.1 | 0.1 |
| w/g | 0.87 | 0.87 | 0.87 | 0.87 |
| slump (cm) | 13.9 | 17.2 | 17.3 | 18.9 |

Inventive example 2, comprising the inventive pulverulent composition, displays a marked increase in the slump, of 36% relative to the blank value and of 10% and 9% relative to the plasticizer solution and to the plasticizer in powder form, respectively.

Dispersing of the Product with Water
Production of Inventive Pulverulent Composition in a Mill 250 g of β-HH are charged to a Grindomix knife mill from Retsch GmbH. A 50 wt % strength aqueous solution of copolymer 1 is applied to the binder by pipette in a quantity sufficient to give an active ingredient content of 0.1 wt % based on β-HH. The material with plasticizer is subsequently mixed at 8000 rpm for 10 seconds. After a short break in mixing, of a few seconds, the mixture is mixed again for a further 10 seconds.

Inventive Example 3

Use of the inventive pulverulent composition as binder in a blend with finely ground limestone (Omyacarb 130 AL) in a ratio of 1:1.

Comparative Example 7

Blend of untreated β-HH with finely ground limestone (Omyacarb 130 AL) in a ratio of 1:1, where the 50 wt % strength aqueous solution of copolymer 1 is added to the mixing water.

Comparative Example 8

Blend of untreated β-HH with finely ground limestone (Omyacarb 130 AL) in a ratio of 1:1, where copolymer 1 is added as a powder to the dry component.

Application Example 3

500 g of a mixture consisting of 250 g of β-HH and 250 g of finely ground limestone (Omyacarb 130 AL) are homogenized in dry form and charged to the mixing vessel of a forced mixer. In the case of inventive example 1, the binder has already been treated with 0.1 wt % of copolymer 1. In the case of inventive examples 2 and 3, the plasticizer is added in liquid form to the mixing water or as powder to the dry component, respectively. In both cases the active ingredient concentration is likewise 0.1 wt % of copolymer 1, based on the β-HH. The pulverulent mixture of β-HH, finely ground limestone, and copolymer 1 is stirred at 950 rpm for 60 sec, with the amount of water required, corresponding to a w/g of 0.8, being added after 5-10 seconds.

During the mixing operation, a note is taken of the time required to give a homogeneous mixture. The results of the application tests for inventive example 3 and for comparative examples 7 and 8 are set out in table 3.

TABLE 3

Determination of the time to homogeneous dispersing of the product with water (blend of β-HH and finely ground limestone, 1:1)

|  | Wt % of copolymer 1 based on β-HH | Time (seconds)* |
|---|---|---|
| Inventive example 3 (according to the invention) | 0.1 | 9 |
| Comparative example 7 | 0.1 | 13 |
| Comparative example 8 | 0.1 | 16 |

*Time required for homogeneous dispersing of the product to be achieved.

The inventive pulverulent composition according to inventive example 3 requires a time which is lower by 31% and 44% than in comparative examples 7 and 8, respectively, until homogeneous dispersing of the product has been achieved.

The invention claimed is:

1. A pulverulent composition comprising, based on the overall mass of the composition:
   A) at least 20 wt % of a calcium sulfate-based binder and
   B) 0.01 to 4 wt % of at least one copolymer at least partially coating the binder, the copolymer obtained by a process comprising polymerizing a mixture of monomers comprising
   (I) at least one ethylenically unsaturated monomer which comprises at least one radical from the series carboxylic acid, carboxylic salt, carboxylic ester, carboxylic amide, carboxylic anhydride, and carboxylic imide and
   (II) at least one ethylenically unsaturated monomer having a polyalkylene oxide radical,
   wherein the pulverulent composition is produced by contacting a powder component comprising a calcium sulfate-based binder with a liquid hydrous component comprising less than 30 wt % of an organic solvent comprising B), wherein the liquid hydrous component is added in an amount of less than 20 wt %, based on the overall mass of the pulverulent composition, and
   wherein the pulverulent composition contains no hydraulic binder.

2. The pulverulent composition according to claim 1, wherein the calcium sulfate-based binder of the powder component comprises anhydrite and/or β-calcium sulfate hemihydrate.

3. The pulverulent composition according to claim 1, wherein the method, after the addition of the liquid hydrous component, comprises no physical drying step.

4. The pulverulent composition according to claim 1, wherein the ethylenically unsaturated monomer (I) is represented by at least one of the following general formulae from the group (Ia), (Ib), and (Ic)

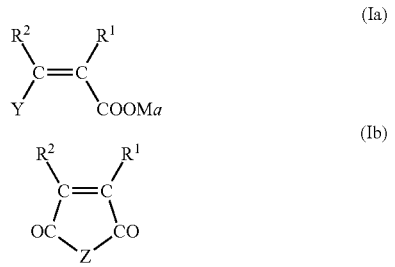

where
$R^1$ and $R^2$ independently of one another are hydrogen or an aliphatic hydrocarbon radical having 1 to 20 C atoms,
Y is H, $-COOM_a$, $-CO-O(C_qH_{2q}O)_r-R^3$, or $-CO-NH-(C_qH_{2q}O)_r-R^3$,
M is hydrogen, a mono- or divalent metal cation, ammonium ion, or an organic amine radical,
a is ½ or 1,
$R^3$ is hydrogen, an aliphatic hydrocarbon radical having 1 to 20 C atoms, a cycloaliphatic hydrocarbon radical having 5 to 8 C atoms, or an optionally substituted aryl radical having 6 to 14 C atoms,
q independently at each occurrence for each $(C_qH_{2q}O)$ unit is identical or different and is 2, 3, or 4,
r is 0 to 200, and
Z is O or $NR^3$,

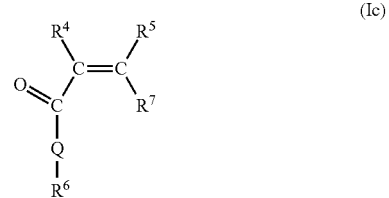

wherein
$R^4$ and $R^5$ independently of one another are hydrogen or an aliphatic hydrocarbon radical having 1 to 20 C atoms, a cycloaliphatic hydrocarbon radical having 5 to 8 C atoms, or an optionally substituted aryl radical having 6 to 14 C atoms,
Q is identical or different and is represented by NH, $NR^3$, or O, where $R^3$ possesses the definition stated above,
$R^6$ is identical or different and is represented by $(C_nH_{2n})-SO_3H$ with n =0, 1, 2, 3, or 4, $(C_nH_{2n})-OH$ with n =0, 1, 2, 3, or 4; $(C_nH_{2n})-PO_3H_2$ with n =0, 1, 2, 3, or 4, $(C_nH_{2n})-OPO_3H_2$ with n=0, 1, 2, 3, or 4, $(C_6H_4)-SO_3H$, $(C_6H_4)-PO_3H_2$, $(C_6H_4)-OPO_3H_2$, and $(C_nH_{2n})-NR^8_b$ with n =0, 1, 2, 3, or 4 and b =2 or 3,
$R^7$ is H, $-COOM_a$, $-CO-O(C_qH_{2q}O)_r-R^3$, $-CO-NH-(C_qH_{2q}O)_r-R^3$, wherein $M_a$, $R^3$, q, and r possess definitions stated above,
$R^8$ is hydrogen, an aliphatic hydrocarbon radical having 1 to 10 C atoms, a cycloaliphatic hydrocarbon radical having 5 to 8 C atoms, or an optionally substituted aryl radical having 6 to 14 C atoms.

5. The pulverulent composition according to claim 1, wherein the ethylenically unsaturated monomer (II) is represented by the following general formula

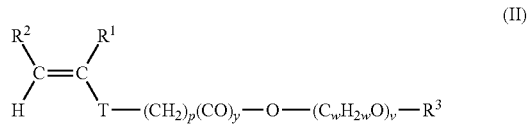

wherein
p is an integer between 0 and 6,
y is 0 or 1,
v is an integer between 3 and 500,
w independently at each occurrence for each $(C_wH_{2w}O)$ unit is identical or different and is an integer between 2 and 18,
T is oxygen or a chemical bond,
$R^1$ and $R^2$ independently of one another are hydrogen or an aliphatic hydrocarbon radical having 1 to 20 C atoms, and
$R^3$ is hydrogen, an aliphatic hydrocarbon radical having 1 to 20 C atoms, a cycloaliphatic hydrocarbon radical having 5 to 8 C atoms, or an optionally substituted aryl radical having 6 to 14 C atoms.

6. The pulverulent composition according to claim 1, wherein the fraction of the monomer (I) in the copolymer is 5 to 95 mol %.

7. The pulverulent composition according to claim 1, wherein the fraction of the monomer (II) in the copolymer is 1 to 89 mol %.

8. The pulverulent composition according to claim 1, wherein the pulverulent composition, based on the overall mass of the composition, comprises between 85 and 99.99 wt % of the calcium sulfate-based binder.

9. The pulverulent composition according to claim 1, wherein the liquid hydrous component is contacted with the powder component by spraying on or atomizing.

10. The pulverulent composition according to claim 1, wherein the powder component is subjected to a mixing operation during and/or after the contacting with the liquid hydrous component to ensure homogeneous application.

11. A gypsum plasterboard, screed, static or self-leveling filling compound, plaster, render or modelling material comprising as a binder the pulverulent composition of claim 1.

12. A binder composition comprising a pulverulent composition according to claim 1 and at least one further binder selected from the group consisting of cement based on Portland cement, white cement, calcium aluminate cement, calcium sulfoaluminate cement, and latent hydraulic and pozzolanic binder.

13. A binder composition comprising a pulverulent composition according to claim 12, wherein the binder composition is a factory dry-mix mortar.

14. A method comprising preparing a liquid hydrous component, wherein the liquid hydrous component comprises less than 30 wt % of an organic solvent and a copolymer obtained by polymerizing a mixture of monomers, wherein the mixture of monomers comprises
(I) at least one ethylenically unsaturated monomer which comprises at least one radical from the series carboxylic acid, carboxylic salt, carboxylic ester, carboxylic amide, carboxylic anhydride, and carboxylic imide and
(II) at least one ethylenically unsaturated monomer having a polyalkylene ether radical,
and spraying or atomizing onto a powder component comprising a calcium sulfate-based binder, thereby obtaining a calcium sulfate-based binder at least partially coated with the copolymer, suitable for accelerating the homogeneous dispersing of the product with water, and
wherein the powder component contains no hydraulic binder.

15. The composition of claim 1, having a slump that is at least 9% greater than a slump of an otherwise-identical composition that instead comprises the copolymer as a separate component in aqueous solution.

16. The composition of claim 1, having a slump that is at least 10% greater than a slump of an otherwise-identical composition that instead comprises the copolymer as a separate dry component.

* * * * *